(12) United States Patent
Guilford

(10) Patent No.: US 10,489,467 B2
(45) Date of Patent: *Nov. 26, 2019

(54) APPARATUS AND METHOD FOR TYING TOGETHER AN HTTP REQUEST AND MULTIMEDIA IN A DATABASE

(71) Applicant: AsterionDB Inc., Irvine, CA (US)

(72) Inventor: Steven Guilford, Los Angeles, CA (US)

(73) Assignee: AsterionDB, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/651,199

(22) Filed: Jul. 17, 2017

(65) Prior Publication Data

US 2018/0189396 A1 Jul. 5, 2018

Related U.S. Application Data

(63) Continuation of application No. 14/504,409, filed on Oct. 1, 2014, now Pat. No. 9,740,779.

(Continued)

(51) Int. Cl.
*G06F 7/02* (2006.01)
*G06F 16/00* (2019.01)
(Continued)

(52) U.S. Cl.
CPC ............ *G06F 16/951* (2019.01); *G06F 16/24* (2019.01); *G06F 16/252* (2019.01);
(Continued)

(58) Field of Classification Search
CPC ......... G06F 17/30887; G06F 17/30864; G06F 17/30861; G06F 17/30386;
(Continued)

(56) References Cited

U.S. PATENT DOCUMENTS 6,385,615 B1* 5/2002 Haeri ................ G06F 17/30876
2007/0276926 A1* 11/2007 LaJoie .................... G06F 21/10
709/219

(Continued)

OTHER PUBLICATIONS

Techterms.,com, "BLOB (Binary Large Object) Definition," retrieved from https://techterms.com/definition/blob through www.archive.org, https://web.archive.org/web/20120607075156/https://techterms.com/definition/blob, dated Jun. 7, 2012. (Year: 2012).*

*Primary Examiner* — Bruce M Moser
(74) *Attorney, Agent, or Firm* — Bryan Fibel

(57) ABSTRACT

Apparatus and method are provided for tying together an HTTP request to a function in the database which returns media data. The invention provides for receiving an HTTP request for data from a web client, wherein the HTTP request includes a URL and dynamic values specific to the web client. The URL can be parsed to determine the resource path and parameters, if any exist. Many databases have functions, also referred to as logical elements, built into the database that can be called to retrieve data. The database function specified in the URL is called using the specified parameters, if any exist, and using the dynamic values from the client. The results can be streamed to the user.

20 Claims, 10 Drawing Sheets

Related U.S. Application Data

(60) Provisional application No. 61/885,317, filed on Oct. 1, 2013.

(51) Int. Cl.

| | | |
|---|---|---|
| *G06F 16/951* | (2019.01) | |
| *H04L 29/06* | (2006.01) | |
| *G06F 16/24* | (2019.01) | |
| *G06F 16/25* | (2019.01) | |
| *G06F 16/957* | (2019.01) | |
| *G06F 16/958* | (2019.01) | |
| *G06F 16/955* | (2019.01) | |
| *H04N 21/239* | (2011.01) | |
| *H04N 21/472* | (2011.01) | |
| *H04N 21/61* | (2011.01) | |
| *H04N 21/658* | (2011.01) | |
| *H04L 29/08* | (2006.01) | |

(52) U.S. Cl.
CPC ........ *G06F 16/957* (2019.01); *G06F 16/9566* (2019.01); *G06F 16/972* (2019.01); *H04L 65/4084* (2013.01); *H04L 65/60* (2013.01); *H04N 21/2393* (2013.01); *H04N 21/47202* (2013.01); *H04N 21/6175* (2013.01); *H04N 21/6581* (2013.01); *H04N 21/6582* (2013.01); *H04L 67/02* (2013.01)

(58) Field of Classification Search
CPC ........... G06F 17/30017; G06F 17/3056; G06F 17/30893; G06F 17/30899; G06F 16/9566; G06F 16/951; G06F 16/95; G06F 16/24; G06F 16/40; G06F 16/252; G06F 16/972; G06F 16/957
See application file for complete search history.

(56) References Cited

U.S. PATENT DOCUMENTS

| | | | |
|---|---|---|---|
| 2009/0083289 A1* | 3/2009 | Morris | G06F 16/9566 |
| 2009/0204481 A1* | 8/2009 | Navar | G06Q 30/02 |
| | | | 725/14 |
| 2010/0125569 A1* | 5/2010 | Nair | G06Q 30/02 |
| | | | 707/722 |
| 2010/0250657 A1* | 9/2010 | Urakawa | G06F 17/30899 |
| | | | 709/203 |
| 2012/0016655 A1* | 1/2012 | Travieso | G06F 17/2827 |
| | | | 704/2 |
| 2012/0173692 A1* | 7/2012 | Lakes | H04L 67/327 |
| | | | 709/223 |
| 2015/0371010 A1* | 12/2015 | Cohen | G06F 17/30038 |
| | | | 726/4 |

* cited by examiner

APPARATUS AND METHOD FOR TYING TOGETHER AN HTTP REQUEST AND MULTIMEDIA IN A DATABASE

CROSS REFERENCE TO RELATED APPLICATIONS

This application is a Continuation that claims priority from a non provisional U.S. patent application Ser. No. 14/504,409 filed on Oct. 1, 2014. application Ser. No. 14/504,409 is a non provisional that claims priority from a provisional U.S. patent application No. 61/885,317 filed on Oct. 1, 2013.

FIELD OF THE INVENTION

Embodiments of the invention generally relate to applications used in retrieval of data from a database. Specifically, embodiments of the invention relate to tying together an HTTP request to a function in the database which returns media data that will be streamed.

BACKGROUND OF THE INVENTION

A database is a collection of data stored in a digital form. Databases have become an integral part of virtually all business and personal applications. A database can store different types of data ranging from personal identification information to various forms of multimedia. Additionally, a database can also contain types of code, referred to as logical elements, which assist in the retrieval and manipulation of data. A computer program can execute functions to return data based on a request from a user. The data can then be displayed to the user.

A uniform resource locator ("URL") is a character string that serves as a reference to a resource. URLs allow a user to access data using a World Wide Web ("Web") browser across a local area or wide area network, such as the Internet. A URL can be used to embed media on a webpage, allowing the media to be streamed and displayed to a user.

SUMMARY

Media data can be organized securely in a database. The present invention satisfies a need to access media data in a database using a URL. Many databases have functions, also referred to as logical elements, built into the database that can be called to retrieve data. A web URL can be used to call such a programming function by formatting the URL in a specific manner.

In accordance with the teachings of the present invention, apparatus and methods are provided for tying together an EMIT' request to a function in the database which returns media data. The invention provides for receiving an HTTP request for data from a web client, wherein the HTTP request includes a URL and dynamic values specific to the web client. The URL is parsed to determine the function and, if they exist, parameters. A call is made to the database function specified in the URL and, if they exist, with parameters specified in the URL and with the dynamic values from the web client. The result can be streamed to the user.

Additionally, after parsing the after parsing the URL, the function specified by the resource path can be validated to determine that it is a logical element within the database. If it is not a valid logical element, an error can be returned to the user.

The parameters specified in the URL can be singular values that will be assigned to the function parameters in sequence. Alternatively, the parameters specified in the URL can be designated by a key and the values will be assigned to the function parameters matching the key

BRIEF DESCRIPTION OF THE DRAWINGS

The accompanying drawings taken in conjunction with the detailed description will assist in making the advantages and aspects of the disclosure more apparent.

DETAILED DESCRIPTION

Figure 1:
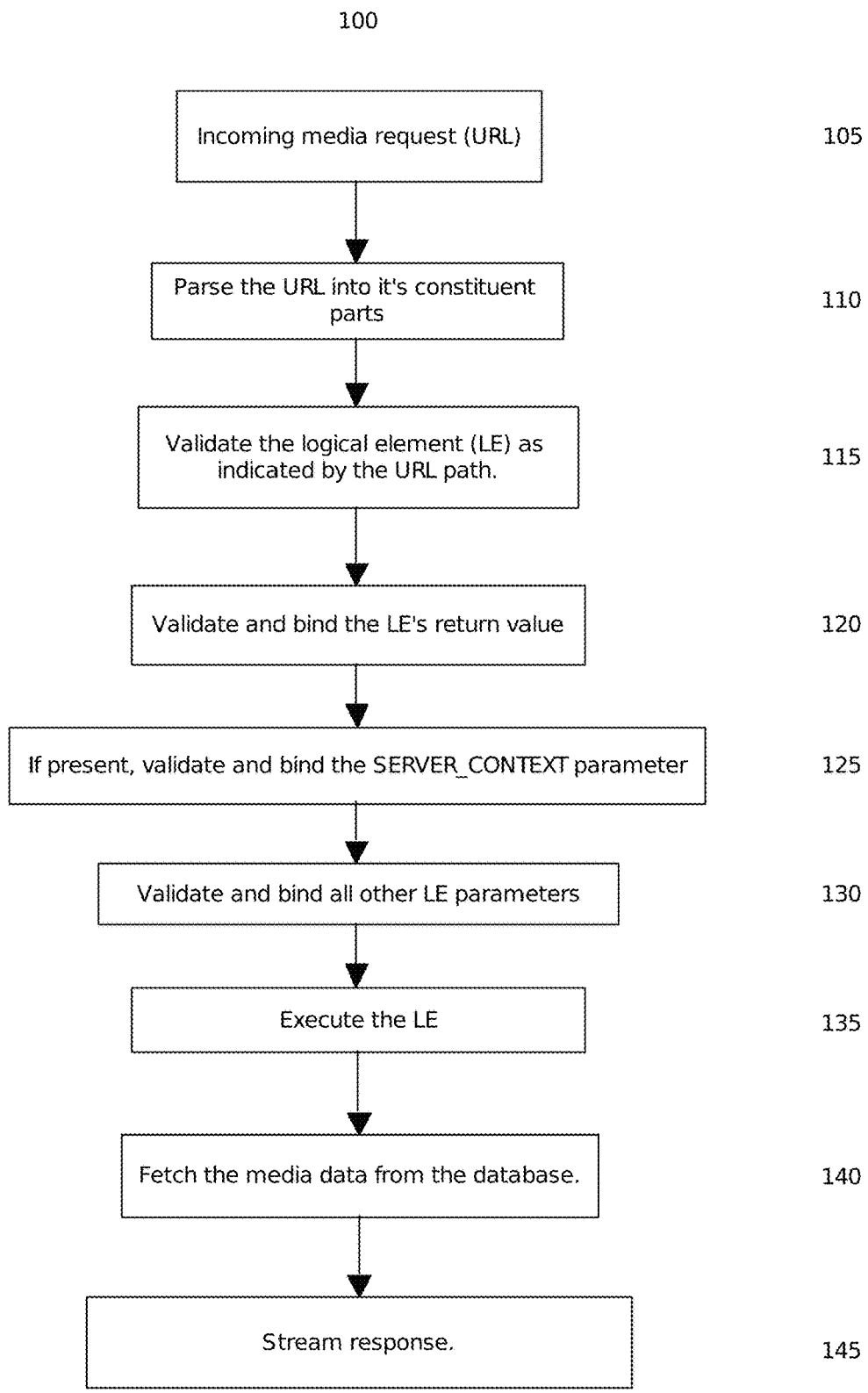
FIG. 1 is a flow chart showing a general overview of how a URL is used to retrieve a multimedia file from a database.

Reference will now be made in detail to the present embodiments discussed herein, illustrated in the accompanying drawings. The embodiments are described below to explain the disclosed method by referring to the Figures using like numerals. It will be nevertheless be understood that no limitation of the scope is thereby intended, such alterations and further modifications in the illustrated device, and such further applications of the principles as illustrated therein being contemplated as would normally occur to one skilled in the art to which the embodiments relate.

The subject matter is presented in the general context of program modules that are able to receive HTTP requests, interface with a database and then stream the resulting multimedia. Those skilled in the art will recognize that other implementations may be performed in combination with other types of program modules that may include different data structures, components, or routines that perform similar tasks. The invention can be practiced using various computer system configurations, such as client server systems. Other usable systems can include, but are not limited to, mainframe computers, microprocessors, personal computers, smart phones, tablets, and other consumer electronic devices. Such computer devices may include one or more processors, memory (hard disk, random access memory, cache memory, etc.), an operating system, and a database.

Apparatus and method for tying together an HTTP request to a function in the database which returns media data are provided. Such an invention allows a user to place a simply constructed URL on a web page to stream multimedia directly from the database, regardless of the multimedia format. The user can know little about the multimedia data, such as media type, and the database in which the multimedia is contained. More logic in the database and server allow for the construction of generalized URLs. Other benefits to this invention include data security and consistency, since most of the information is contained within the database. Instead of multimedia files located in a file folder hierarchy, multimedia data can be organized in a database for easy retrieval. An explanation of tying an HTTP request to logic in the database follows.

A piece of computer code that returns a value is referred to as a function. Many databases have functions, also referred to as logical elements, built into the database. Such logic within the database can be organized into standalone logical elements, such as individual functions and procedures, or collections of associated logical elements, such as functions and procedures that are contained within a package. Databases with these built-in functions are referred to as logically enabled databases. There are databases lacking such logic, but one, who is skilled in the art, could add the same functionality to a database to convert it to a logically enabled database in order for the invention to be performed. For the purpose of this invention a function that returns a binary large object ("BLOB"), datatype or an object which is a collection of datatypes containing at least one BLOB datatype, is necessary. BLOBs are typically images, audio or other multimedia objects and tend to be relatively large amounts of data.

A web URL can be used to call such a programming function by formatting the URL in a specific manner. Using a typical URL, http://www.example.com, a media path can be appended to the basic URL with the addition of a third '/' character:

http://www.example.com/function.

URL parameters can be added to refer to parameters in a function call. Parameters in the URL can be specified as a "key=value" tuple. In this format, it is evident what value is assigned to what parameter. For example, the two additional parameters, param1 with a value of 'foo' and param2 with the value of 'bar', can be added to the original example URL as:
http://www.example.com/
function?param1=foo&param2=bar.

Alternatively, parameters in the URL can be specified as a singular "value". In this format, the order of the parameters determines which parameter has what value. For example, the two additional parameters, param1 with a value of foo and param2 with the value of bar, can be added to the original example URL as:
http://www.example.com/function?foo&bar.

Regardless of how the URL is constructed, as long as it adheres to general URL formatting requirements, it is only necessary that the function name and any parameters can be identified from the URL.

As illustrated in FIG. 1, a flow chart 100, showing a general overview of how a URL is used to retrieve multimedia data from a database, is provided.

Once assembled, the URL can be placed on a webpage to access multimedia data in the database. The request for media data is received in the form of the encoded URL 105. Often this will be a URL request from a web client to a media server. Additionally, values specific to the web client are received and stored in a SERVER_CONTEXT object.

The URL is separated into its constituent parts, the media path and the parameters 110. In the preferred embodiment, the media path appears after the http/www.example.com as delineated by the third '/' character. Any parameters appearing after the '?' character can then be parsed and counted using the '&' delimiter.

Once identified, the media path can be validated as a logical element within the database 115. The media path is determined to be one of the following:
a function within the server's database context,
a function within a foreign context in the database,
a function within a package contained in the server's database context
or a function within a package contained in a foreign context in the database.

The function's return value is examined for datatype validation 120. The function returns either a BLOB datatype or an object containing a BLOB datatype. If the object contains more than one BLOB datatype, then the first one is used. Alternatively, if the object contains more than one BLOB datatype, a parameter can indicate which one will be used for the return value.

The function parameters are examined. If one is SERVER_CONTEXT, the SERVER_CONTEXT parameter datatype is validated and the SERVER_CONTEXT items are assigned 125. All other parameters are validated and assigned values corresponding to the URL parameters 130. The parameters can be easily identified as "key=value" tuples or singular "values." If the parameters are "key=value" tuples, then the passed parameters are matched based on their corresponding "key". If the parameters are in the singular "value" format, then the order of the parameters in the URL determines how the values are set.

The logical element can then be executed 135 to fetch the BLOB value 140. If the function fails, an error is reported. If successful, the BLOB data can be streamed to the requesting web client using the appropriate network layer protocol 145.

At various steps in the present embodiment, the URL content is validated in order to determine if the process can be successfully completed. These validation checks are in place because the URL can be placed on a webpage by any user who has little understanding beyond simple URL construction. They add safeguards against bad user input in such an embodiment. Other embodiments may include more or less validation logic.

After successful validation, the program will proceed to bind variables for the return value and parameters. Binding indicates to the database where to assign the variable and is a term known to those skilled in the art.

Figure 2:
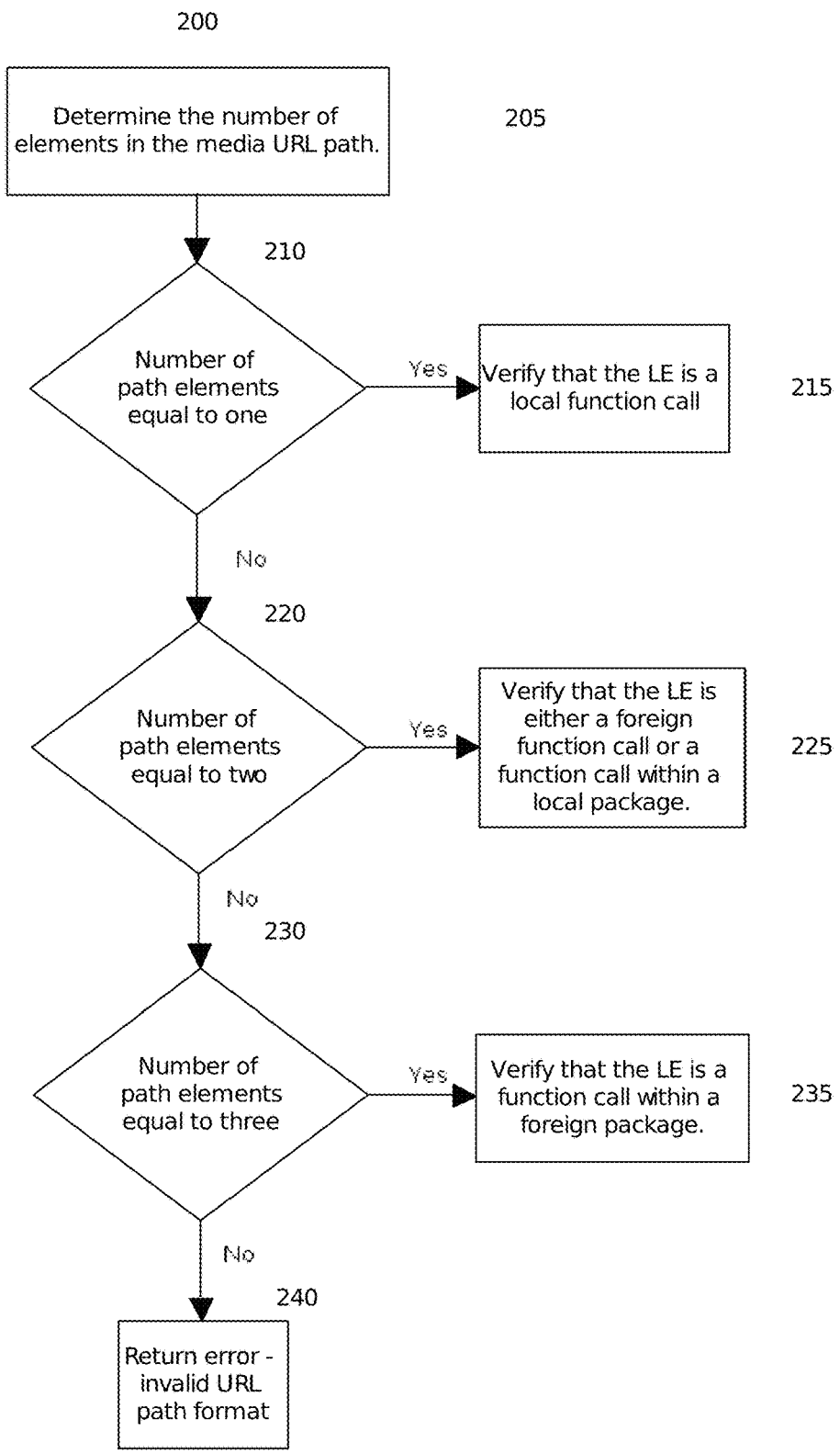
FIG. 2 is a flow chart showing how the logical element, as indicated by the URL path, is validated.

Expanding on 115, as illustrated in FIG. 2, a flow chart 200 showing how the logical element is validated is provided.

The elements in the URL media path determine the type of logical element. The media path is examined to determine the number of elements in the media path 205. The elements can be parsed and counted using the '/' delimiter. If the number of elements in the URL media path is equal to one 210, the logical element is verified to be a local function call (http://www.example.com/function) 215. If the number of elements in the URL media path is equal to two 220, the logical element is verified to be a function call within a foreign context of the database (http://www.example.com/databasecontext/function) or a function call within a local package (http://www.example.com/package/function) 225. If the number of elements in the URL media path is equal to three 230, the logical element is verified to be a function call within a package contained in a foreign context in the database (http://www.example.com/databasecontext/package/function) 235. If the media path elements do not match any of the possible logical elements, then an error for an invalid media path is reported 240.

Figure 3:
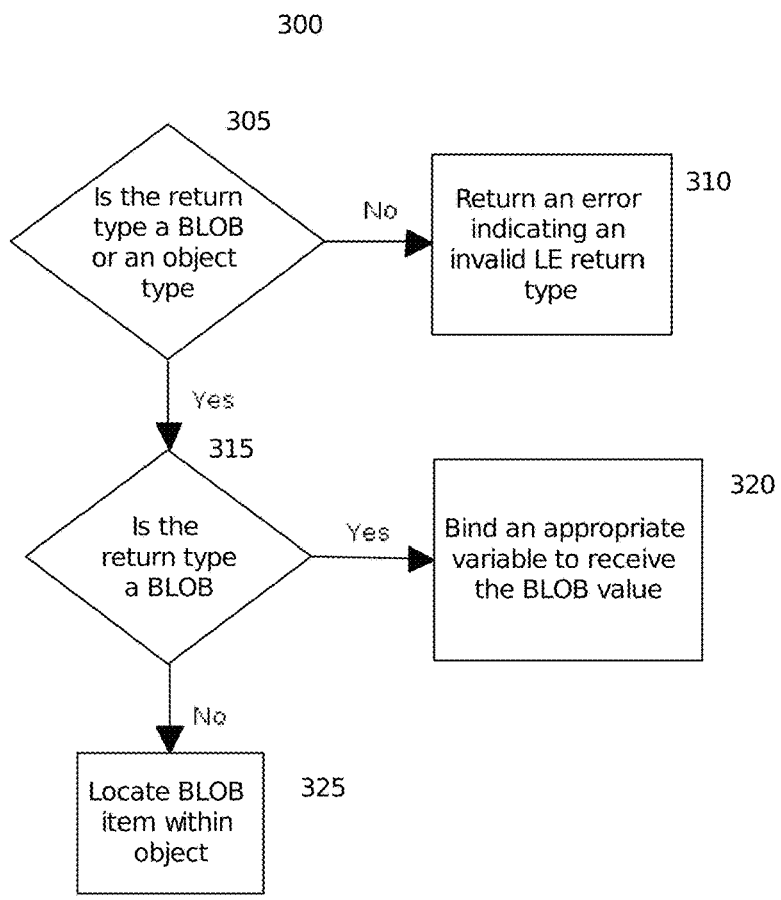
FIG. 3 is a flow chart showing how the logical element's return value is validated.

Expanding on 120, as illustrated in FIG. 3, a flow chart 300 showing how the logical element's return value is validated is provided.

It is necessary to determine that the logical element returns either a BLOB datatype or an object which contains a BLOB datatype 305. If it is neither, then an error for an invalid return datatype is reported 310. If the return type is a BLOB 315, then an appropriate variable is bound to receive the value 320. If the return type is an object which is a collection of datatypes, an appropriate variable is hound, and a BLOB datatype can be located within the object 325.

Figure 4:
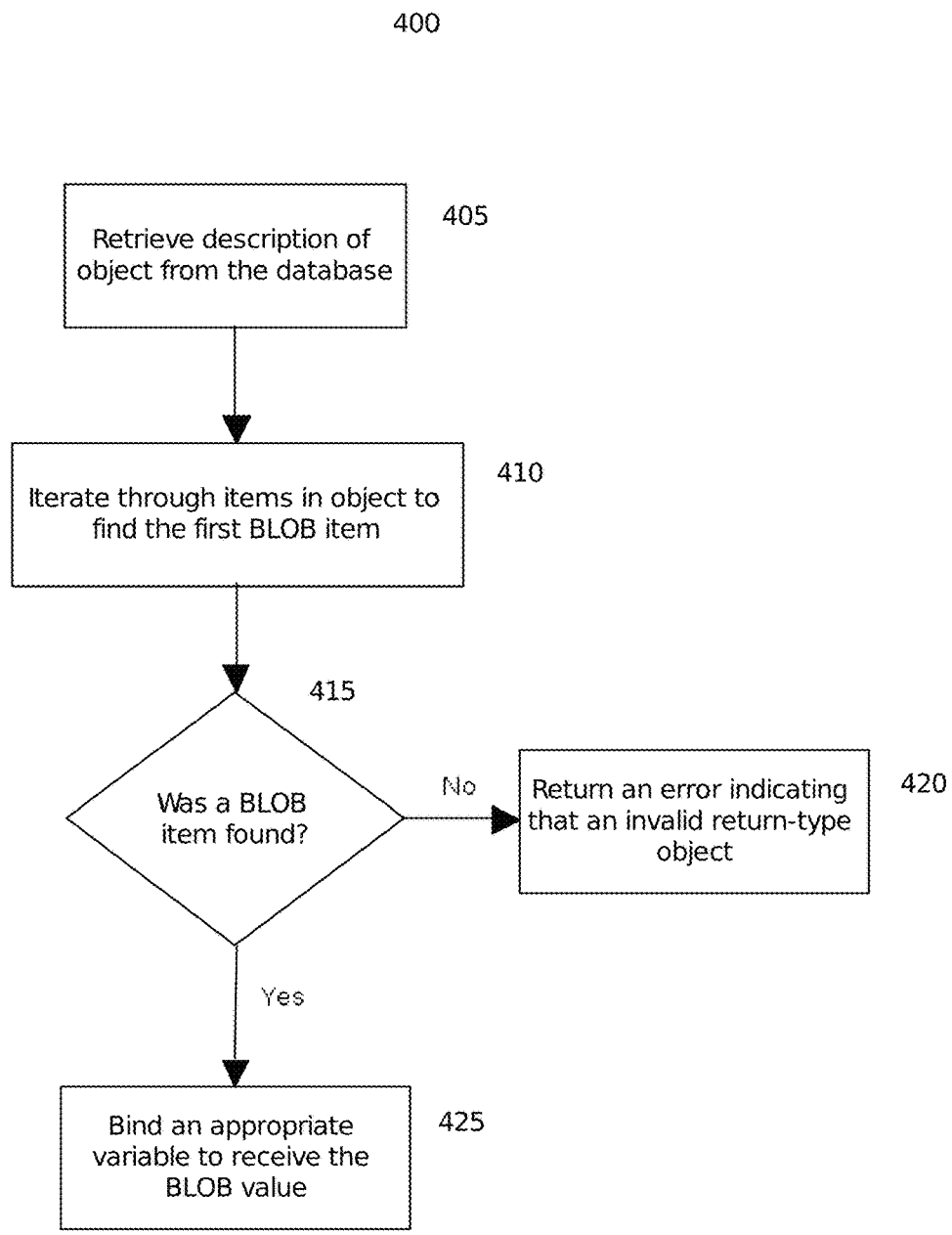
FIG. 4 is a flow chart showing how a BLOB datatype is located within an object that is a collection of datatypes.

Expanding on 325, as illustrated in FIG. 4, a flow chart 400 showing how a BLOB datatype is located within an object that is a collection of datatypes is provided.

A description of the return object can be retrieved from the database 405. In the present embodiment, the first BLOB datatype contains the return value. The first BLOB datatype can be found by iterating through the collection of datatypes in the object 410. If a BLOB item is not found 415, then an error for an invalid return type object is reported 420. If a BLOB item is found 415, then an appropriate variable is bound to receive the value 425.

In addition to the static values passed by the URL, such as the media path and parameters, the web server processes dynamic values. Such dynamic values are generated by the client and the server at the time of the media request. This information, which does not appear on the URL, is pulled from the web browser without input from the user or webpage author. An object of variables, named SERVER_CONTEXT in the present embodiment, is used to convey this dynamic information. The SERVER_CONTEXT can contain, but is not limited to, the screen size, network bandwidth, server name, client socket, accepted media types, and other necessary data that is not provided by the URL. If the SERVER_CONTEXT is found to be a necessary parameter to the function provided by the URL, the SERVER_CONTEXT object will be used convey the dynamic values to the function. The name of the object, SERVER_CONTEXT in the present embodiment, is only significant in that the server and any functions that server will execute, must be aware of acrd agree to the use of this variable name.

Figure 5:
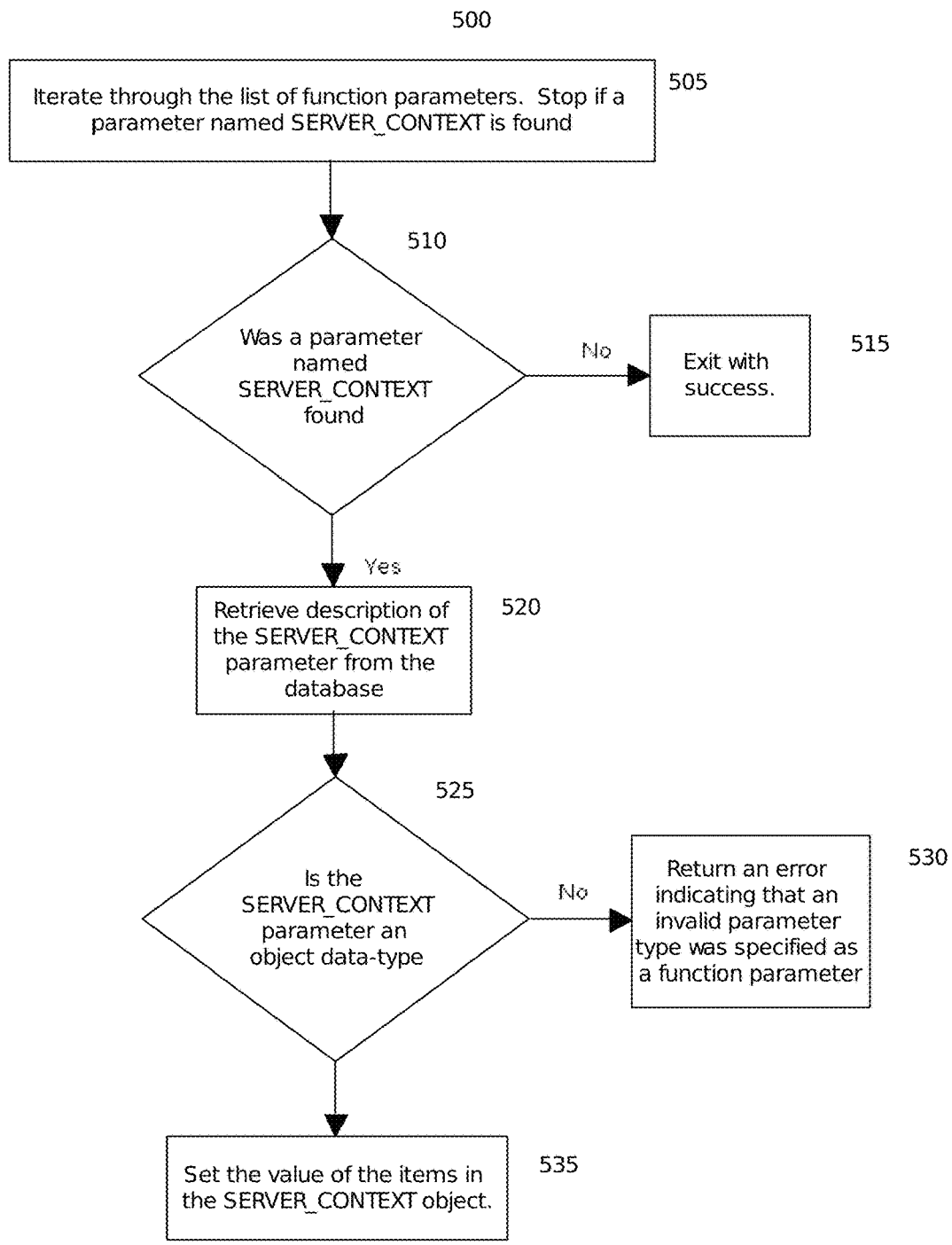
FIG. 5 is a flow chart showing how the logical element's parameters are validated and assigned is provided.

Expanding on 125, as illustrated in FIG. 5, a flowchart 500 showing how the SERVER_CONTEXT is validated is provided.

The SERVER_CONTEXT parameter can be found by iterating through the list of the function parameters until a SERVER_CONTEXT object is found 505. If a SERVER_CONTEXT parameter is not found 510, then the process continues 515 to validation of the remaining parameters. If a SERVER_CONTEXT is found 510, the description of the SERVER_CONTEXT parameter is retrieved from the database 520. If the SERVER_CONTEXT parameter is not an object datatype and is instead some other datatype such as an integer or string 525, then an error indicating that an invalid parameter type was specified as a function parameter is reported 530. If the SERVER_CONTEXT parameter is an object datatype 525, the value of the items in the SERVER_CONTEXT object can then be set 535.

Figure 6:
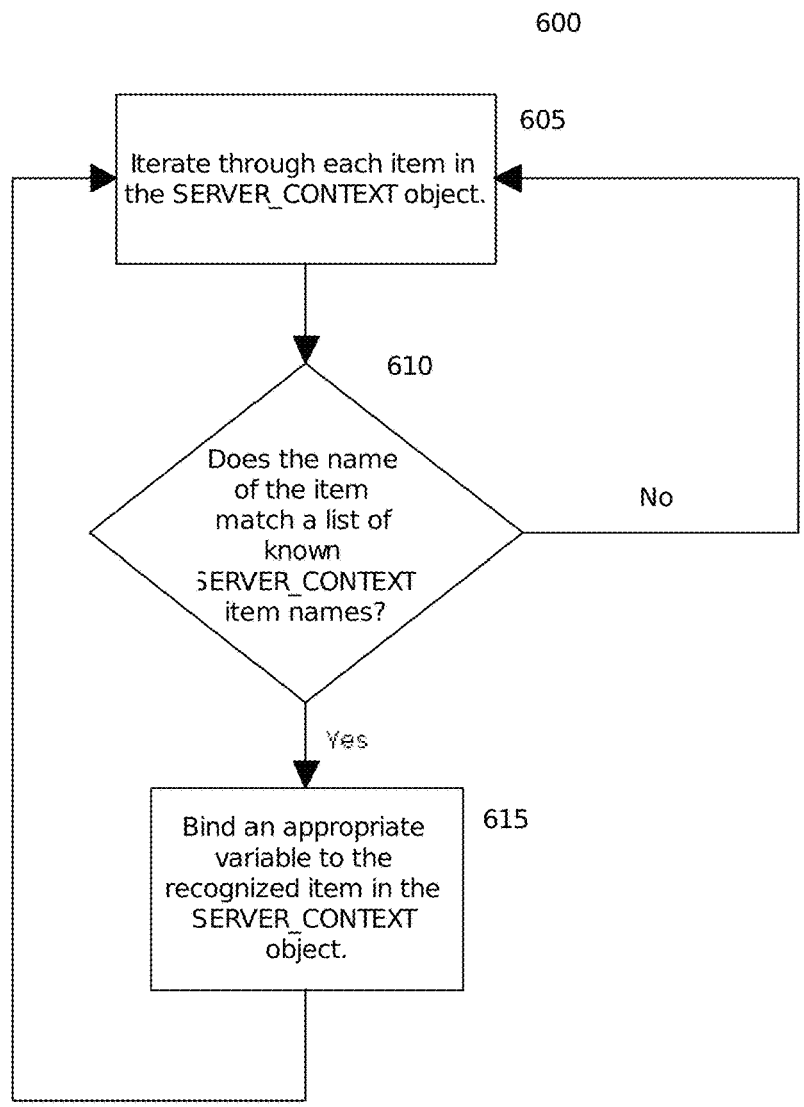
FIG. 6 is a flow chart showing how the SERVER_CONTEXT is validated.

Expanding on 535, as illustrated in FIG. 6, a flowchart 600 showing how the items in the SERVER_CONTEXT are set is provided.

Setting the SERVER_CONTEXT with dynamic values from the web server can be done by iterating through each item in the SERVER_CONTEXT object 605. Each item name is compared against a known and agreed to set of SERVER_CONTEXT variable names from the property definition 610. If no match is found, the process continues to the next item. If a match is found, the process binds the appropriate dynamic value to the item in the SERVER_CONTEXT object 615.

Figure 7:
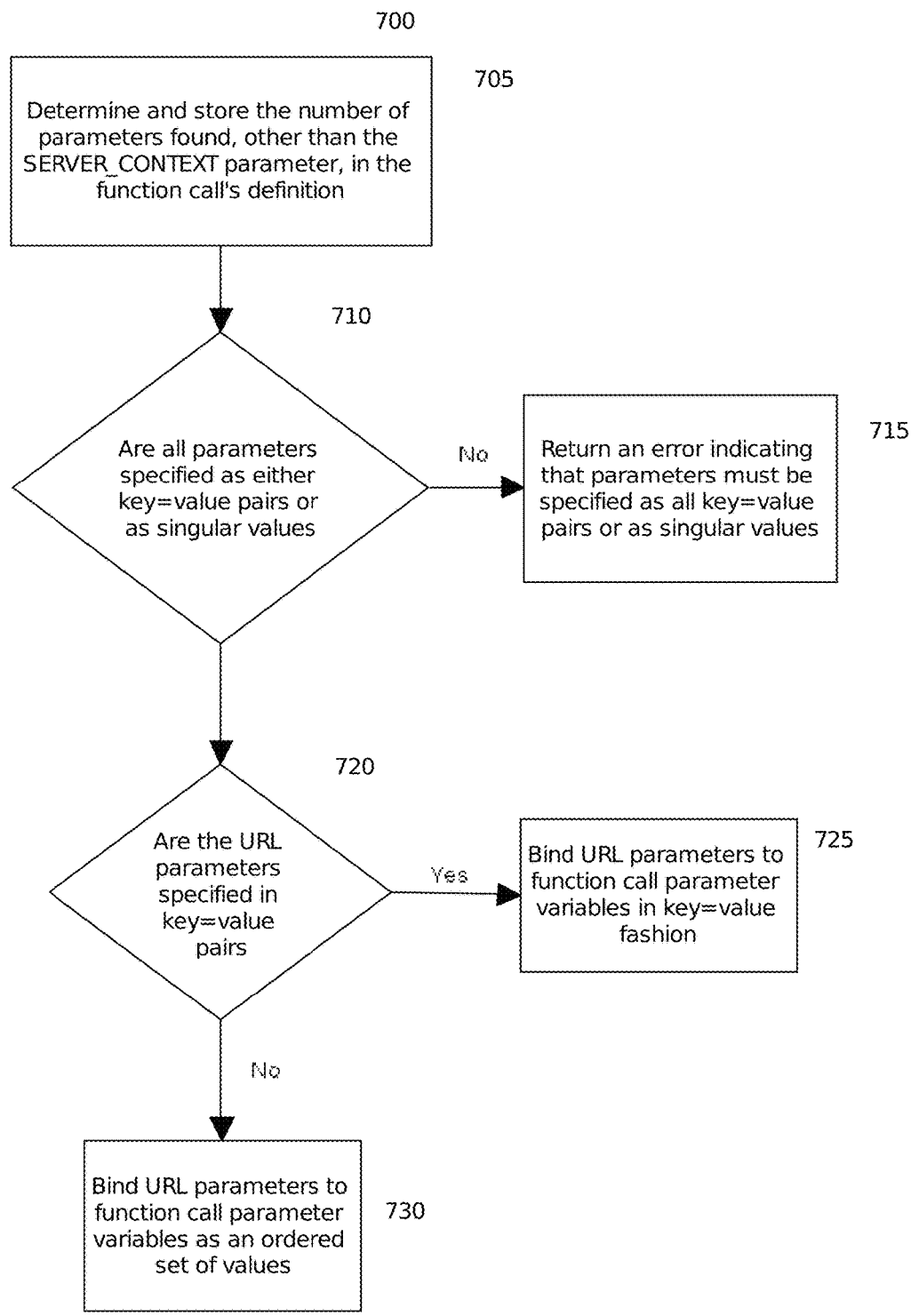
FIG. 7 is a flow chart showing how the items in the SERVER_CONTEXT are set.

Expanding on 130, as illustrated in FIG. 7, a flowchart 700 showing how the logical element's parameters are validated and assigned is provided.

The number of parameters found in a function's definition, not counting the SERVER_CONTEXT parameter if present, can be determined to establish a parameter count 705. This count will be used in validating and setting the parameters from the URL. The parameters from the media path can be easily identified as "key=value" tuples, by checking for the existence of '=' characters, or singular values. It is necessary that all parameters be specified in the same format as "key=value" pairs or as singular values 710. If not, then an error indicating that all parameters be specified as "key=value" pairs or as singular values is reported 715. If the parameters are in the "key=value" format 720, then the URL parameter values are assigned to the function call parameters by matching the 'keys' 725. Any parameters in the function without a corresponding match are not assigned a value. Otherwise, the parameters are in the singular "value" format and will be set according to the order they appear in 730. If all of the parameters are in the singular "value" format, then the count of passed parameters is validated to be greater than or equal to the number of parameters in the function.

Figure 8:
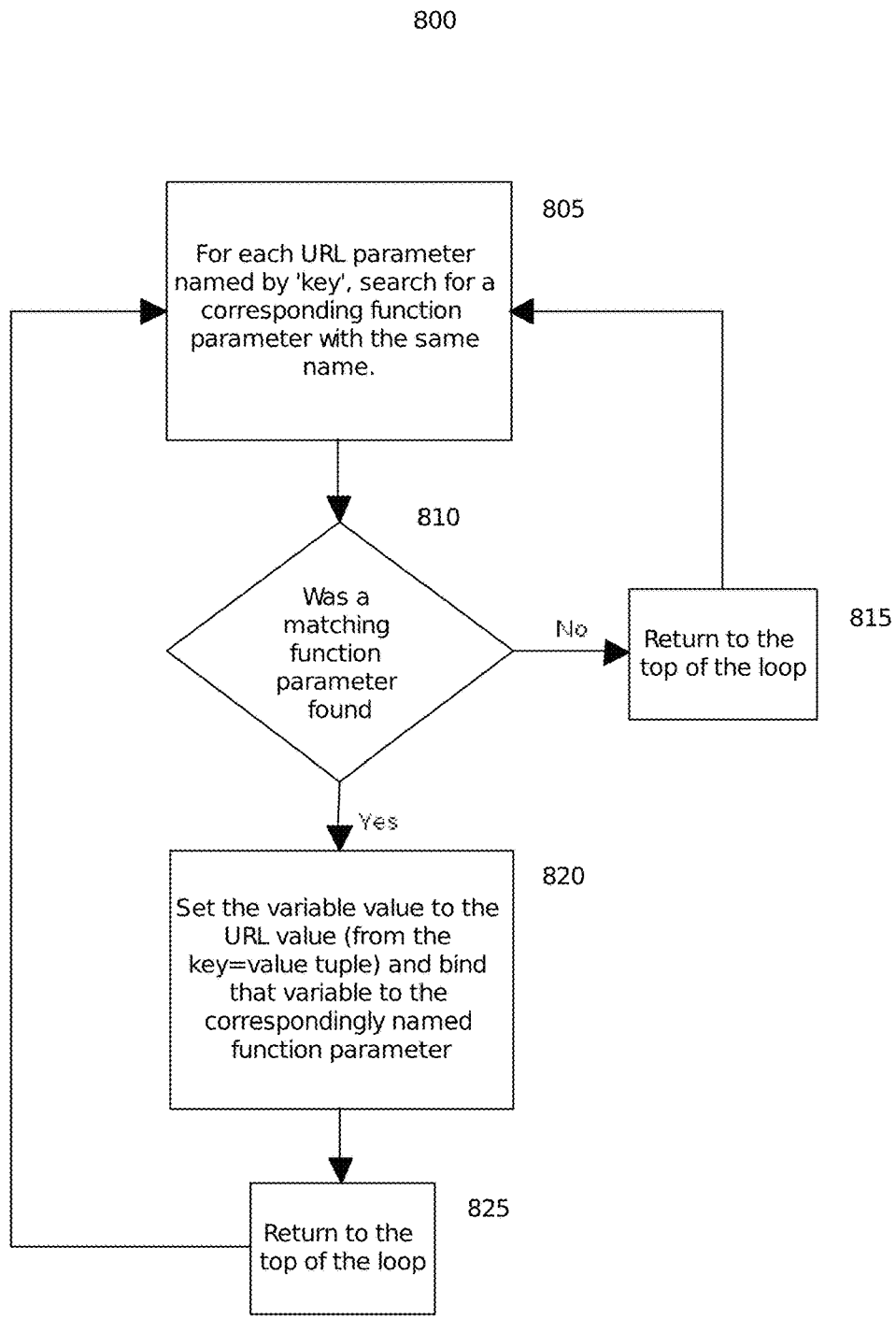
FIG. 8 is a flow chart showing how the URL parameters are assigned to the function call parameter variables in the "key=value" format.
Figure 9:
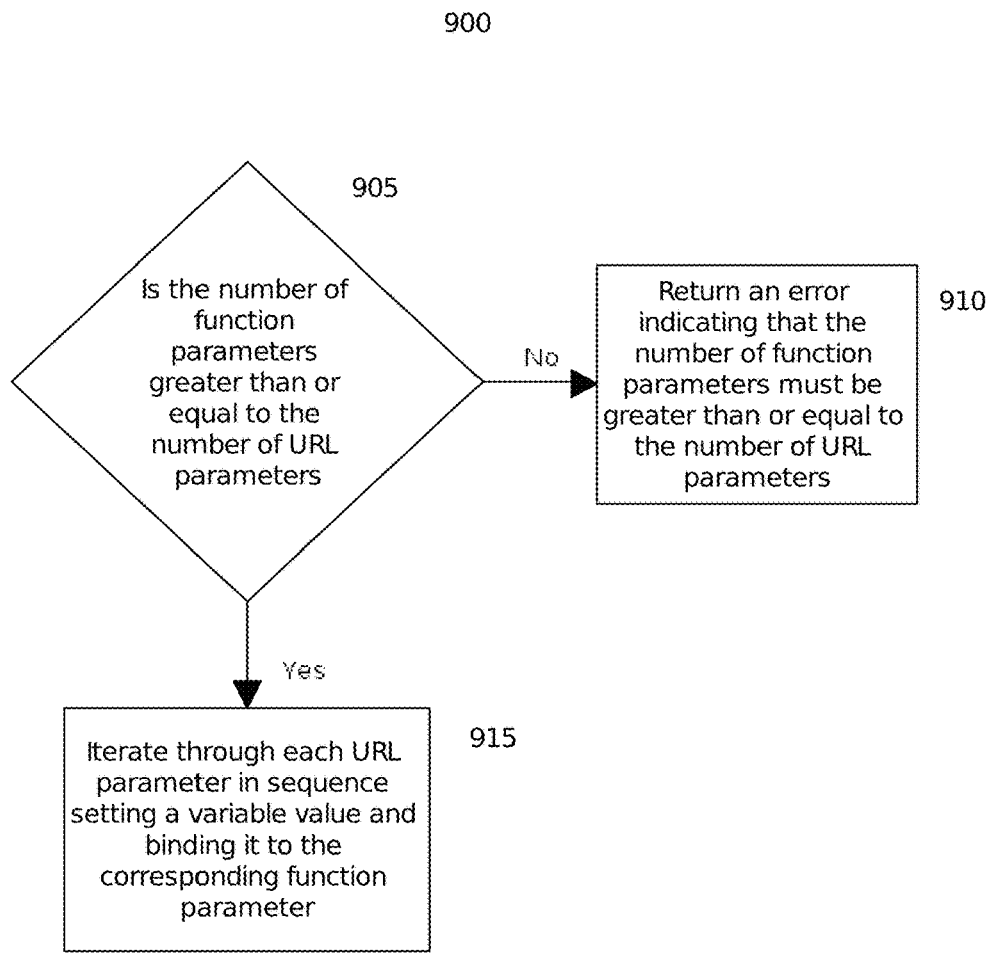
FIG. 9 is a flow chart showing how the URL parameters are assigned to the function call parameter variables in the singular "value" format.

Expanding on 715, as illustrated in FIG. 8, a flowchart 800 showing how the URL parameters are assigned to the function parameter variables in the "key=value" format is provided.

For each URL parameter named by "key", a matching function parameter can be found by to iterating through the function parameters 805. If a matching function parameter is not found 810, then, return to the top of the loop and continue with the next URL parameter 815. If a matching parameter is found 810, then set a variable value to the URL value, from the "key=value" tuple, and bind the variable to the correspondingly named function parameter 820. Afterwards, return to the top of the loop and continue with the next URL parameter 825.

Expanding on 720, as illustrated in FIG. 8, a flowchart 900 showing how the URL parameters are assigned to the function parameter variables in the singular "value" format is provided.

If the URL parameters are in the singular "value" format, the number of URL parameters is determined. The number of function parameters is validated to be greater than or equal to the number URL parameters 905. If this is not the case, then, an error indicating that number of function parameters should be greater than or equal to the number of URL parameters is reported 910. If the number of parameter numbers passes validation, then, it is possible to iterate through each URL parameter in sequence setting a variable value and binding it to the corresponding function parameter 915.

Figure 10:
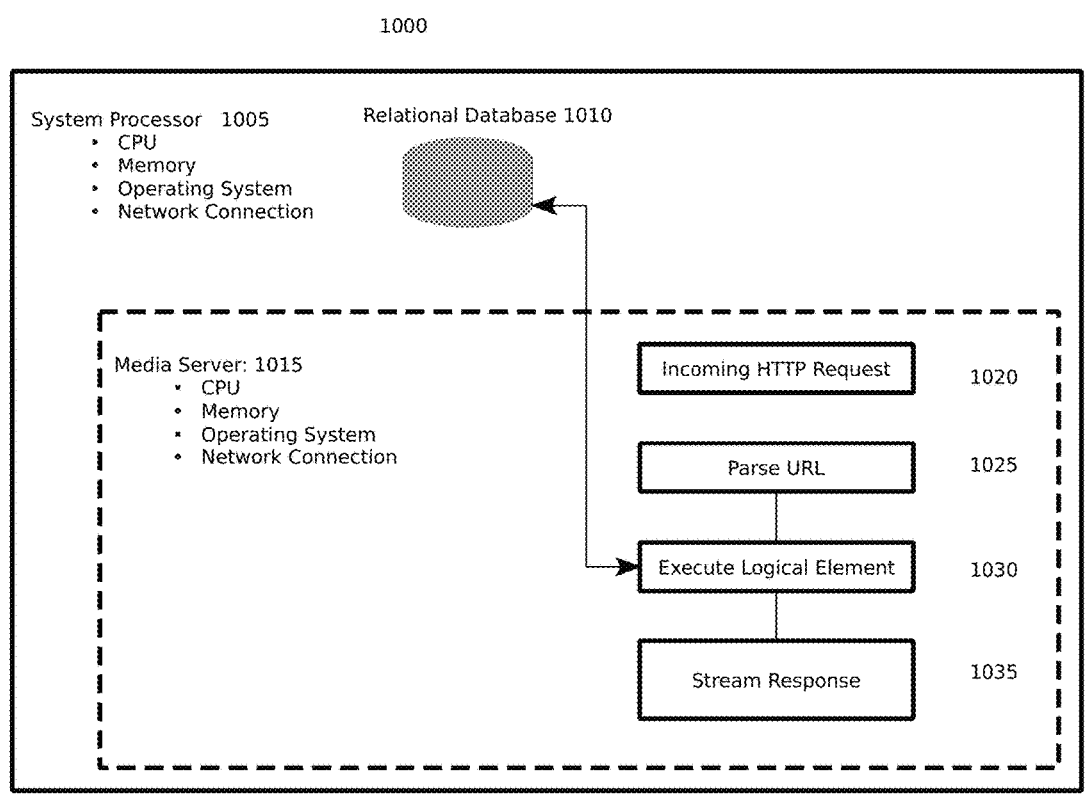
FIG. 10 is a block diagram of a general system embodiment

The function can then be executed to retrieve the multimedia file from the database. Such a function may be, as an example, a general retrieval function, (specified in the URL) that takes as parameters an asset ID (specified in the URL) and a SERVER_CONTEXT. The SERVER_CONTEXT items identify the required media type and maximum screen size. The function can query the database for a multimedia asset with a key ID equal to the specified ID, media type equal to the specified media type, and a screen size value less than or equal to the specified screen size. If a multimedia asset is successfully retrieved, it can be streamed to the requesting web client As illustrated in FIG. 10, a block diagram 1000 of a general system embodiment is provided.

A general system embodiment on a computer is presented. In the depicted embodiment, there exists a system processor 1005 and a media server 1015. Some components of the computer include a CPU, memory (hard disk, random access memory cache memory, etc.), an operating system, network connection, and a relational database 1010. The media processor receives an incoming HTTP request for data 1020. This includes a media URL and dynamic values from the web client. The media processor then parses the URL to determine the media path and parameters, if any exist 1025. Once identified, the logical element is executed 1030. The resulting media data can be streamed back to the user 1035. In a variation of this system, a single processor on a computer performs all tasks. In another embodiment, any number of resource servers on separate computers can access the system processor containing the database.

The preceding description contains various embodiments of the invention and no limitation of the scope is thereby intended.

That which is claimed is:

1. A media server apparatus comprising at least one processor and at least one memory including computer program code the at least one memory and the computer program code configured with the at least one processor, to cause the apparatus at least to:
receive an HTTP request for BLOB data from a web client, wherein the HTTP request includes a media URL and dynamic values specific to the web client;
parse the media URL to determine a database function and any parameters;
validate the database function to determine that the database function returns either a BLOB datatype or an object that contains at least one BLOB datatype;
make a call to the database function specified in the media URL and with any parameters specified in the media URL and with the dynamic client values;
stream to the web client, BLOB data returned from the database function.

2. The apparatus of claim 1, wherein the parameters specified in the media URL are designated by a key and are assigned to database function parameters matching the key.

3. The apparatus of claim 1, wherein if it is determined that the database function returns an object that contains at least one BLOB datatype, the first BLOB will be used for a return value;
otherwise, if it is determined that the database function returns a BLOB datatype, the BLOB will be used for a return value.

4. The apparatus of claim 1, wherein if it is determined that the database function returns an object that contains at least one BLOB datatype, a parameter indicates which BLOB will be used for a return value;
otherwise, if it is determined that the database function returns a BLOB datatype, the BLOB will be used for a return value.

5. The apparatus of claim 1, wherein the call to the database function is a local function call.

6. The apparatus of claim 1, wherein the call to the database function is a function call within a context foreign to the database.

7. The apparatus of claim 1, wherein the call to the database function is a function call within a local package.

8. The apparatus of claim 1, wherein the database function call is to a database that is located on the apparatus.

9. The apparatus of claim 1, wherein the database function call is to a database that is not located on the apparatus.

10. A media server apparatus comprising at least one processor and at least one memory including computer program code the at least one memory and the computer program code configured to, with the at least one processor, cause the apparatus at least to:
receive an HTTP request for BLOB data from a web client, wherein the HTTP request includes a media URL and dynamic values specific to the web client;
parse the media URL to determine a database function and any parameters;
store the dynamic client values in an object of variables;
make a call to the database function specified in the media URL and with any parameters specified in the media URL and with the dynamic client values passed to the database function using the object of variables;
stream to the web client, BLOB data returned from the database function.

11. The apparatus of claim 10 further comprising:
after storing the dynamic values in an object of variables, validate that the object of variables is a parameter of the database function.

12. The apparatus of claim 10, wherein the call to the database function is a local function call.

13. The apparatus of claim 10, wherein the call to the database function is a function call within a context foreign to the database.

14. The apparatus of claim 10, wherein the call to the database function is a function call within a local package.

15. The apparatus of claim 10, wherein the database function call is to a database that is located on the apparatus.

16. The apparatus of claim 10, wherein the database function call is to a database that is not located on the apparatus.

17. A method comprising:
receiving an HTTP request for BLOB data from a web client, wherein the HTTP request includes a media URL and dynamic values specific to the web client;
parsing the media URL to determine a database function and any parameters;
storing the dynamic values in an object of variables;
making a call to the database function specified in the media URL and with any parameters specified in the media URL and with the dynamic client values passed to the database function using the object of variables;
streaming to the web client, BLOB data returned from the database function.

18. The method of claim 17 further comprising:
after storing the dynamic values in an object of variables, validating that the object of variables is a parameter of the database function.

19. The method of claim 17, wherein the call to the database function is a local function call.

20. The method of claim 17, wherein the call to the database function is a function call within a context foreign to the database.

* * * * *